United States Patent [19]
Randazzo et al.

[11] Patent Number: 6,015,114
[45] Date of Patent: Jan. 18, 2000

[54] METHOD AND APPARATUS FOR EXPEDITIOUSLY PROVIDING A REEL OF INSULATION MATERIAL TO AN INSULATING MACHINE

[75] Inventors: Antonio Randazzo, Venice; Rossano Galassi, Florence, both of Italy

[73] Assignee: Axis USA, Inc., Tampa, Fla.

[21] Appl. No.: 08/998,045

[22] Filed: Dec. 24, 1997

Related U.S. Application Data

[60] Provisional application No. 60/042,908, Mar. 27, 1997.

[51] Int. Cl.[7] .............................. B65H 19/00; B65H 26/06
[52] U.S. Cl. .................................... 242/559.2; 242/562.1; 242/563; 242/563.2; 242/564.4
[58] Field of Search .............................. 242/559.2, 559.3, 242/559.4, 560, 560.1, 563.2, 533.4, 533.5, 533.6, 563, 564.4, 562.1

[56] References Cited

U.S. PATENT DOCUMENTS

| | | | |
|---|---|---|---|
| 1,780,469 | 11/1930 | Dinsmoor | 242/559.2 |
| 1,984,744 | 12/1934 | Hood | 242/533.4 X |
| 2,202,883 | 6/1940 | Yoder | 242/533.6 |
| 2,396,805 | 3/1946 | Schwartz | 242/560 X |
| 3,640,480 | 2/1972 | Schleich | 2242/563.2 X |
| 3,709,604 | 1/1973 | Niesen et al. | 242/563.2 X |
| 3,776,481 | 12/1973 | Ichikawa | 242/533.5 |
| 4,632,326 | 12/1986 | Boote et al. | 242/560 X |
| 4,643,783 | 2/1987 | Hogenson | 242/559.3 X |
| 4,648,927 | 3/1987 | Droll et al. | 156/159 |
| 5,699,979 | 12/1997 | Spada et al. | 242/563.2 X |

FOREIGN PATENT DOCUMENTS

| | | | |
|---|---|---|---|
| N9814 | 3/1956 | Germany | 242/559.2 |
| 87 04 357 U | 6/1987 | Germany . | |
| 836 352 | 6/1960 | United Kingdom . | |

*Primary Examiner*—Donald P. Walsh
*Assistant Examiner*—William A. Rivera
*Attorney, Agent, or Firm*—Fish & Neave; Robert R. Jackson

[57] ABSTRACT

A reel changing device which includes at least two reel holders, where each reel holder is for holding a reel of insulation material, and a support member to which each reel holder is rotatably mounted is provided. The support member is movable so that each reel holder can be positioned to provide insulation material to the insulating machine. In one embodiment of the invention, the support member is rotatable about an axis to provide insulation material to the insulating machine. In another embodiment of the invention, the support member is linearly movable to provide insulation material to the insulating machine. The reel changing device of the present invention can be incorporated into a system for expeditiously providing insulation material to an insulating machine.

10 Claims, 5 Drawing Sheets

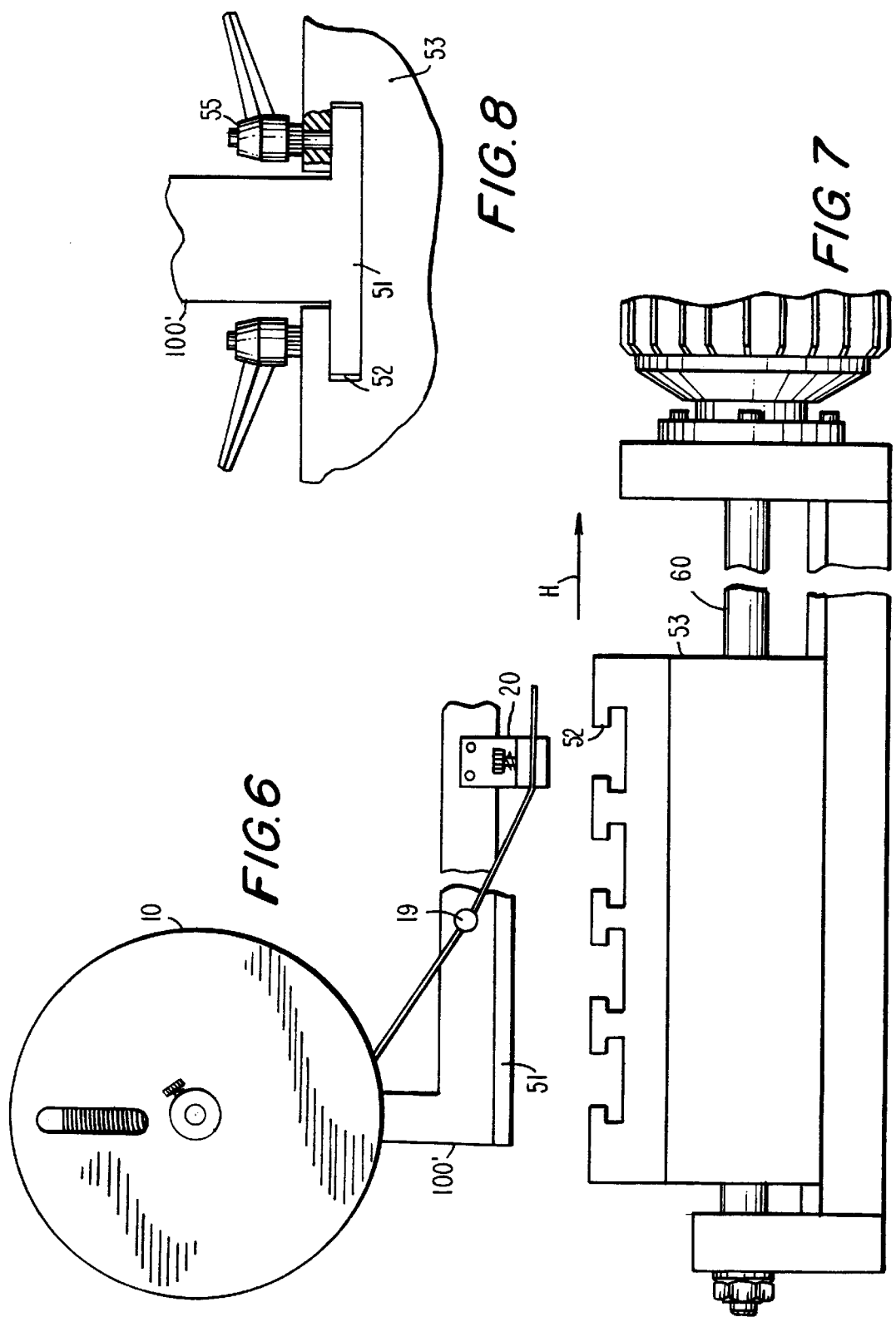

METHOD AND APPARATUS FOR EXPEDITIOUSLY PROVIDING A REEL OF INSULATION MATERIAL TO AN INSULATING MACHINE

This application claims the benefit of U.S. provisional application No. 60/042,908, filed Mar. 27, 1997 now expired.

BACKGROUND OF THE INVENTION

This invention relates to method and apparatus for expeditiously providing a reel of insulation material to an insulating machine. More specifically, this invention relates to method and apparatus for providing a reel of insulation material to an insulating machine such that there is minimal downtime and minimal disruption when the reel needs to be changed with another reel.

It is known in the art to provide a reel of insulation material to an insulating machine so that the insulating machine can utilize the insulation material to form an insulation lining or the like for placement in the core slots of stators or armatures used in electric motors or alternators. It is also known in the art for the insulating machine to utilize the insulation material to form a wedge for the radially outermost coils in the slots of the stators or the armatures. As used herein, "reel" is defined as a strip of insulation material coiled on itself which is unwound during the operation of the insulating machine and is cut and formed into an insulation lining or the like.

The significant problem posed by known methods and apparatus for providing a reel of insulation material to an insulating machine is the downtime and the disruption of the operation of the insulating machine whenever the reel needs to be changed with another reel. Changing of the reel is required, for example, when the insulation material has run out or the particular insulation material of the reel is no longer suitable.

It is desired, therefore, to provide method and apparatus for expeditiously providing a reel of insulation material to an insulating machine such that there is minimal downtime and minimal disruption when the reel needs to be changed with another reel.

SUMMARY OF THE INVENTION

One object of the invention is to provide a reel of insulation material to an insulating machine in an expeditious manner.

Another object of the invention is to provide insulation material to an insulating machine with minimal downtime and minimal disruption when the insulation material being provided to the insulating machine needs to be changed.

These and other objects of the invention are realized by a reel changing device which includes at least two reel holders, where each reel holder is for holding a reel of insulation material, and a support member to which each reel holder is rotatably mounted. The support member is movable so that each reel holder can be positioned to provide insulation material to the insulating machine.

In one embodiment of the invention, the support member is rotatable about an axis to provide insulation material to the insulating machine. In another embodiment of the invention, the support member is linearly movable to provide insulation material to the insulating machine.

The reel changing device of the present invention can be incorporated into a system for expeditiously providing insulation material to an insulating machine.

Machinery where the invention can be applied has been described in U.S. Pat. No. 4,831,716, 4,854,033, and RE 34195, and U.S. application Ser. No. 08/418,635 assigned to the same assignee of this application.

Further features of the invention, its nature and various advantages will be more apparent from the accompanying drawings and the following detailed description of the preferred embodiments.

BRIEF DESCRIPTION OF THE DRAWINGS

FIG. 6 shows a support arm together with its corresponding reel holder of another embodiment of a reel changing device of the present invention.

FIG. 7 shows a movable table with openings for receiving the support arm of FIG. 6.

FIG. 8 shows the support arm of FIG. 6 removably mounted on the table of FIG. 7.

DETAILED DESCRIPTION OF THE INVENTION

Figure 1:
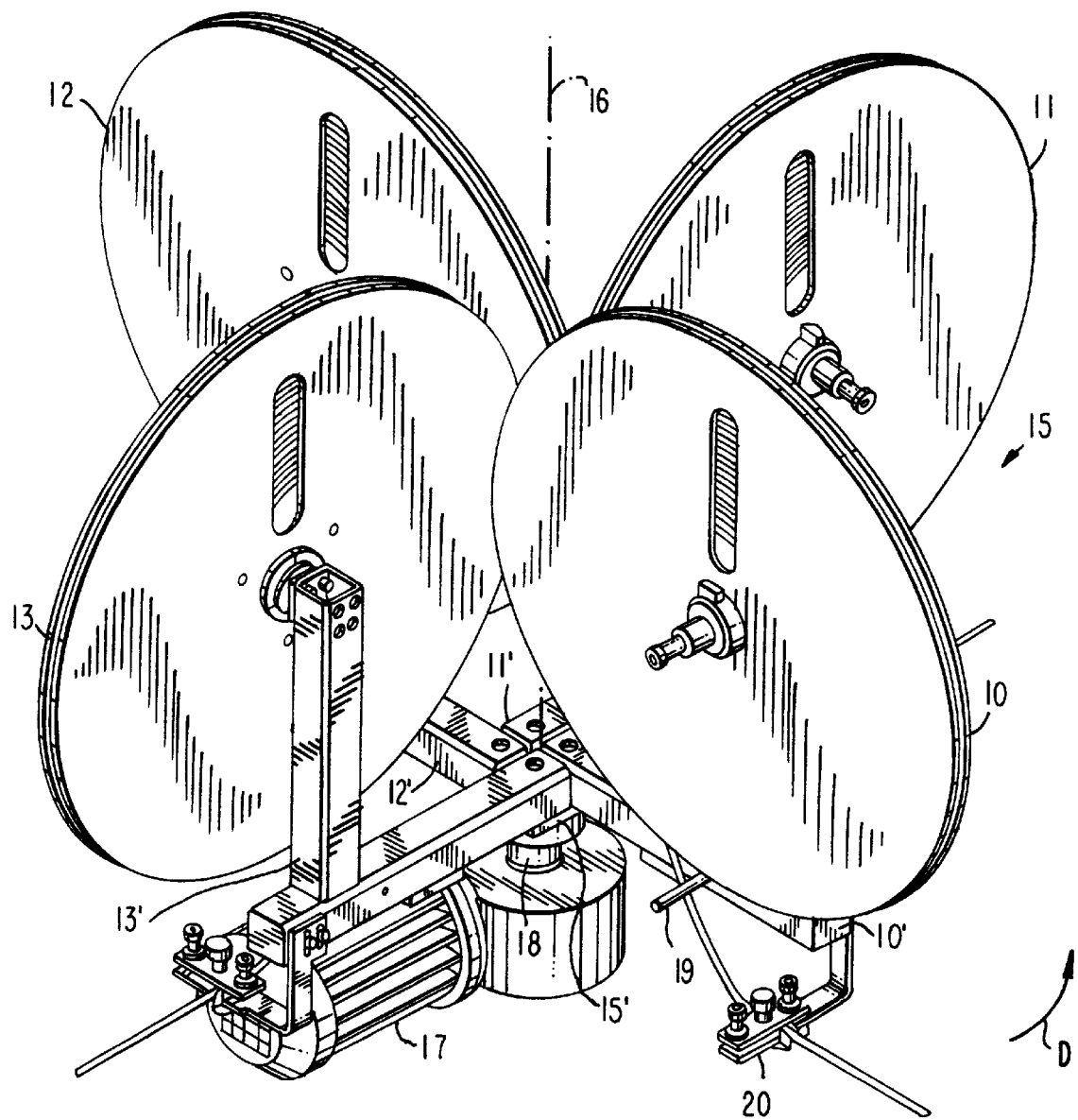
FIG. 1 is an embodiment of a reel changing device of the present invention.

FIG. 1 shows a reel changing device 15 of the present invention. The device 15 includes reel holders, four of which 10, 11, 12, 13 are shown for illustrative purposes in FIG. 1, and a support member to which the reel holders are rotatably mounted. In the embodiment of FIG. 1, the support member is shown as support arms 10', 11', 12', 13', each of which corresponds to a reel holder 10, 11, 12, 13.

The support arms 10', 11', 12', 13' are secured to a central plate 15' by bolts or other conventional securing means. In the embodiment illustrated in FIG. 1, the support arms 10', 11', 12', 13' are secured to the central plate 15' so that the reel holders 10, 11, 12, 13 are all at the same radial distance from an axis 16 orthogonally intersecting the center of the plate 15'.

A mechanical actuator, such as a motor and clutch unit 17, is coupled to the central plate 15' by means of a shaft 18 to rotate all the support arms 10', 11', 12', 13' about the axis 16. This movement of the support member, indicated by arrow D, is used for changing a reel of insulation material provided to the insulating machine (not shown), as will be described in greater detail hereinbelow.

Each support arm of the support member has attached thereto a guide, shown as a rod 19, having an opening through which a reel of insulation material passes and a brake pad assembly 20. The guide and the brake pad assembly are used in directing a reel of insulation material from the reel holder to the insulating machine (not shown), as will be described hereinbelow.

Figure 2:
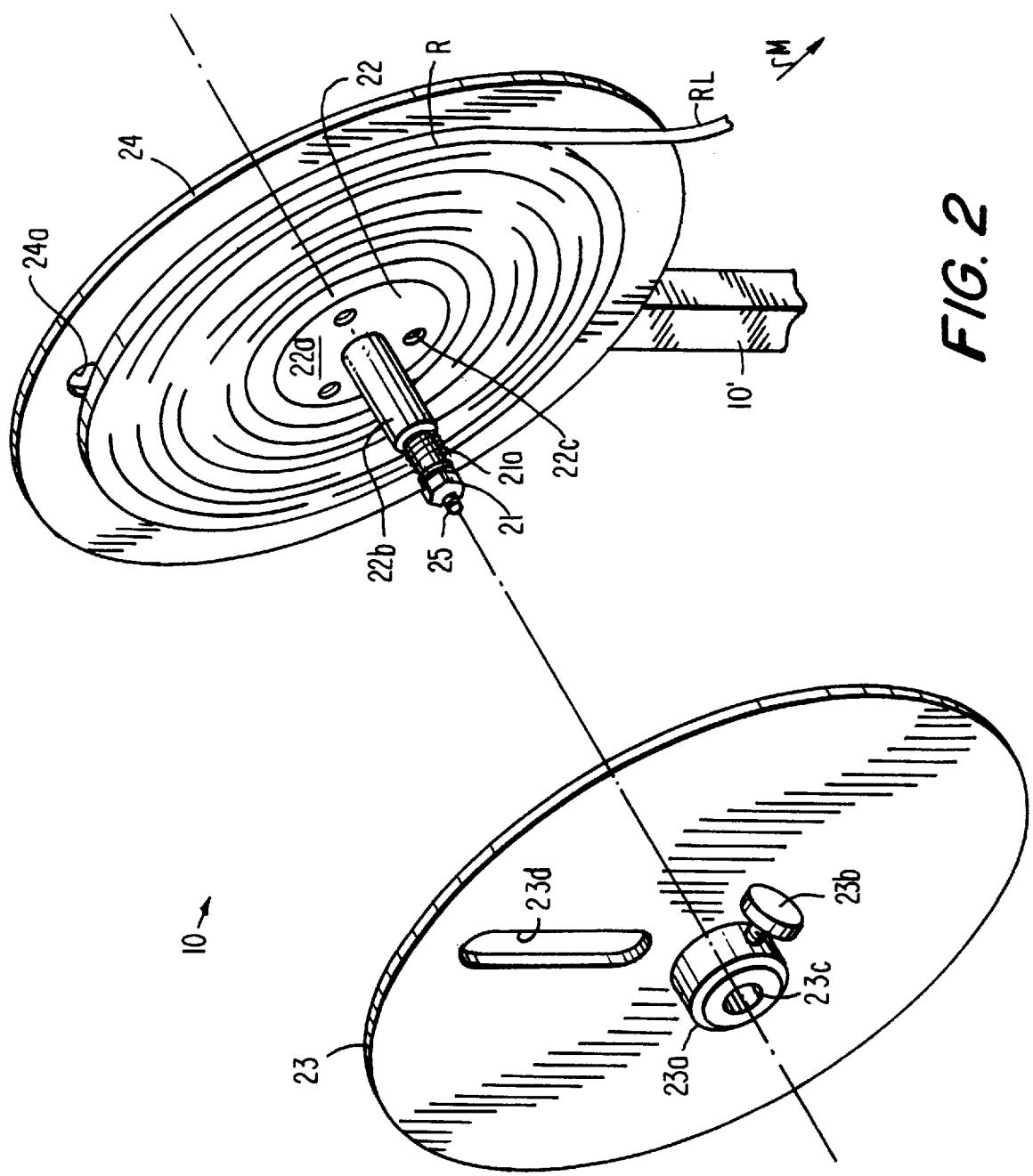
FIG. 2 is a perspective view of a reel holder of the reel changing device of FIG. 1.

FIG. 2 is a perspective view of one of the reel holders 10 of FIG. 1. It should be noted that although FIG. 1 shows all of the reel holders 10, 11, 12, 13 as being the same size and configuration, it should be apparent to one skilled in the art that the device 15 may be modified to accommodate reel holders of different sizes and configurations.

The reel holder 10 includes a first disk 23 and a second disk 24 for holding the reel R of insulation material therebetween. The second disk 24 has a central member 22 which includes a flange portion 22a and an extending portion 22b having a bore with a preselected diameter. The flange portion 22a is attached to the second disk 24 by conventional means, such as screws 22c shown in FIG. 2. A bolt 25 having a diameter smaller than the preselected diameter of the bore of the extending portion 22b extends through the bore and is attached to the support arm 10' so that the second disk 24 is free to rotate about the bolt 25. In this manner, the second disk 24 having the reel R mounted on the flange portion 22a is free to rotate when the reel R of insulation material is being fed to the insulating machine in direction M. Note that the insulation material of the reel R provides frictional contact with the flange portion 22a which it abuts so that the dereeling of the reel R in the direction M causes the rotation of the reel holder 10.

As shown in FIG. 2, a nut 21 is provided to the bolt 25 to prevent the second disk 24 from slipping off the bolt 25. A pressure spring 21a is provided between the nut 21 and the extending portion 22b to ensure that the rotation of the second disk 24 is not affected by any frictional abutment of the nut 21 and the extending portion 22b.

The first disk 23 includes a hub 23a having a hole 23c and a tightening member, shown by a manually rotatable screw 23b on the hub 23a. The hole 23c is configured so that the first disk 23 can be slid over the extending portion 22b and secured thereto by the screw 23b being rotated to abut the extending portion 22b. The first disk 23 is spacedly secured from the reel R to permit unimpeded dereeling of the reel R when the reel R of insulation material is being fed to the insulating machine. Both the first and second disks 23, 24 are shown with openings 23d, 24a, respectively, which are utilized to indicate the amount of the reel R left in the reel holder 10.

Feeding the reel R to the insulating machine is achieved by pulling the lead portion RL of the reel R through the opening in the rod 19 and the brake pad assembly 20 (see FIG. 1). The brake pad assembly 20 is conventional and as is known in the art, it serves to maintain alignment of the reel R towards the insulating machine and it provides adjustable frictional pressure on the reel R so that the drag force on the reel R can be adjusted as needed during the feeding of the reel of insulation material to the insulating machine.

In the embodiment of the reel changing device 15 illustrated in FIG. 1, each support arm 10', 11', 12', 13' is provided with the rod 19 and the brake pad assembly 20. However, it is to be noted that the rod 19 and the brake pad assembly 20 are only necessarily provided to the support arm holding the reel holder which is providing a reel of insulation material to the insulating machine.

When the reel R being fed to the insulating machine (not shown) needs to be changed, for example because the insulation material of the reel R has run out, the support member is rotated in direction D (see FIG. 1) to provide another reel holder having a new reel (such as the reel in reel holder 13 of FIG. 1) to the insulating machine. The rotation of the support member is caused by actuation of the motor and clutch unit 17 and is permitted by release of a first catch member 26 and a second catch member 26' (FIG. 3).

Figure 3:
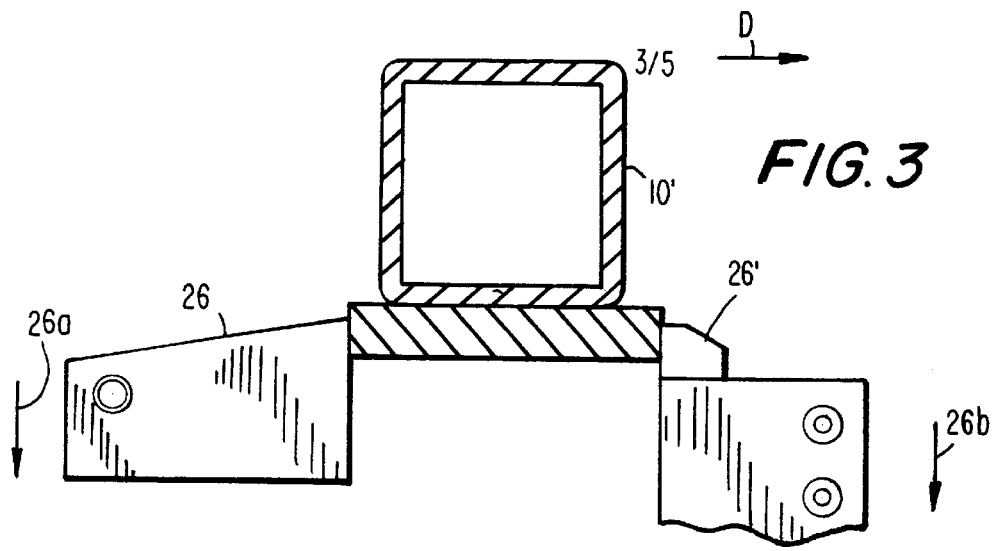
FIG. 3 illustrates catch members of the reel changing device of FIG. 1.

FIG. 3 illustrates the first and second catch members 26, 26' of the reel changing device 15 acting on the support arm 10'. These catch members 26, 26' act on the support member to prevent movement of the reel holder which is positioned to provide a reel of insulation material to the insulating machine and to maintain the reel in alignment with the insulating machine.

The operation of the first and second catch members 26, 26' is as follows. When the reel of insulation material being provided to the insulating machine needs to be changed (for example, the reel in reel holder 11), the second catch member 26' is moved in direction 26b as indicated in FIG. 3 by a conventional mechanical means (not shown) to permit the support arm (support arm 11' in the example) holding the reel to be changed to rotate in direction D. Likewise, the first catch member 26 is moved in direction 26a by a conventional mechanical means (not shown), which may be the same as the mechanical means actuating the second catch member 26'. Prior to a support arm (support arm 10' in the example) holding a new reel of insulation material being positioned to provide the new reel of insulation material to the insulating machine, the second catch member 26' is moved back to stop this support arm. Once this support arm (10') is abutting the second catch member 26', the first catch member 26 is moved back to capture the support arm between the catch members 26, 26' so that the new reel of insulation material is properly positioned to provide the insulation material to the insulating machine. This is shown in FIG. 3.

Figure 4:
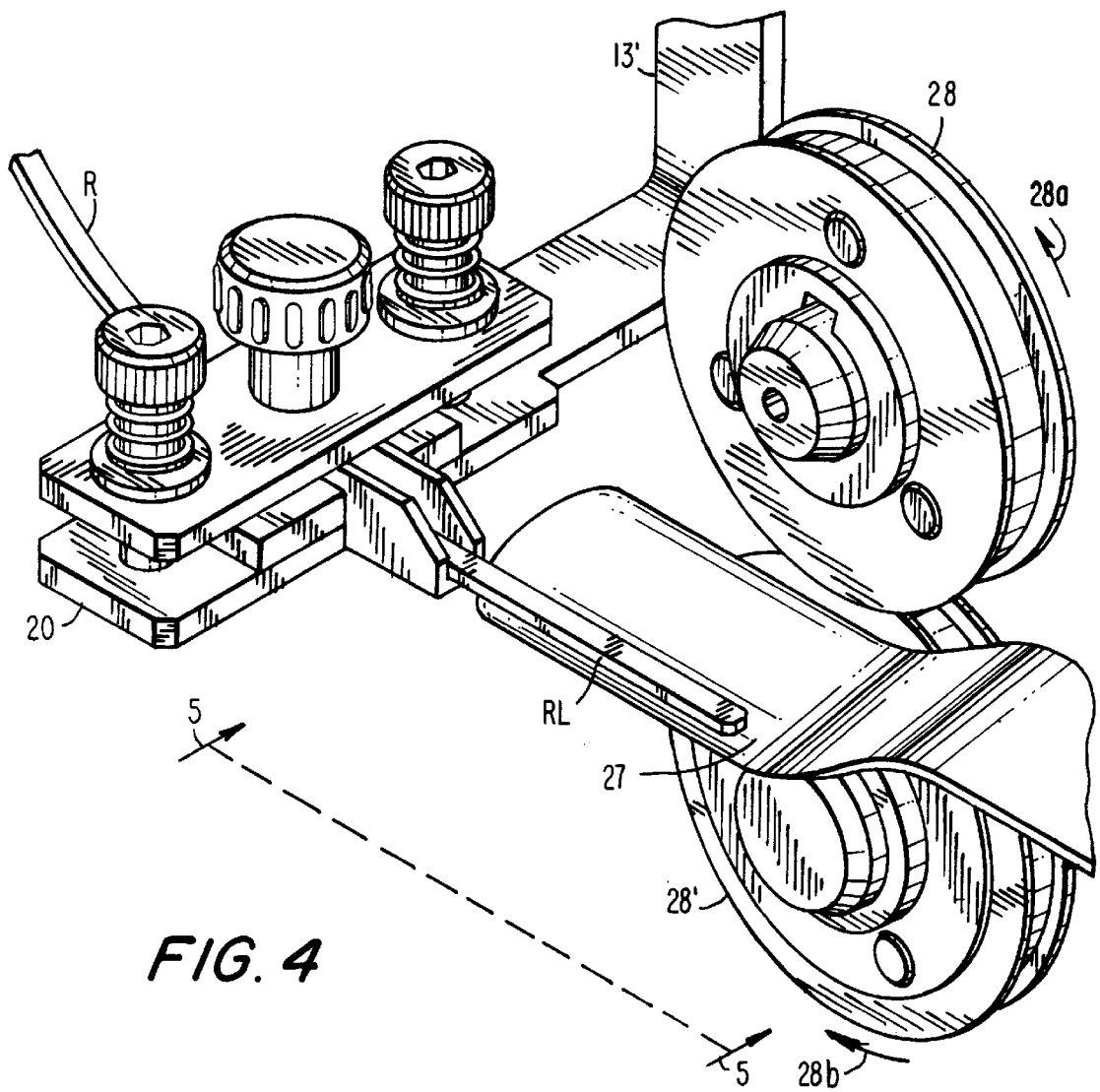
FIG. 4 shows a portion of a system which incorporates the reel changing device of FIG. 1.

FIG. 4 shows a portion of a system for expeditiously providing insulation material to an insulating machine, where the system incorporates the reel changing device 15 of the present invention. In addition to the reel changing device 15, the system includes a guide surface 27 adjacent an input member, shown illustratively as input rollers 28, 28', of the insulating machine. When a support arm, such as 13', is moving into the position shown in FIG. 3 to provide a new reel to the insulating machine, the lead portion RL of the new reel R encounters the guide surface 27. This guide surface 27 guides the moving reel R to the input rollers 28, 28'.

In FIG. 4, the guide surface 27 is illustrated as an elevated tongue-like structure having a lower portion and an elevated portion. The lower portion is provided to ensure that the lead portion RL of the reel R, which may have a slight downward bend depending upon the insulation material, comes into contact with the guide surface 27 for guidance thereby. It should be apparent to those skilled in the art that the configuration of the guide surface should be such that the lead portion RL of the reel R is directed into the rollers 28, 28' by the guide surface 27 when the support arm carrying the reel is moved to be captured by the catch members 26, 26', as described hereinabove.

Once the lead portion RL is properly positioned between the rollers 28, 28', the rollers will clamp the lead portion RL and turn in directions 28a, 28b, respectively, to feed the insulation material of the new reel R to the insulating machine. As the rollers turn in directions 28a, 28b, the disks 23, 24 holding the reel R are caused to be rotated by the pulling force of the rollers acting on the reel of insulation material, and thus allow dereeling of the reel R with minimum slipping of the insulation material which is clamped between the rollers. The brake pad assembly 20 ensures that when the rollers 28, 28' are drawing the insulation material from the disks 23, 24, there is no uncontrollable feed of the insulation material.

Figure 5:
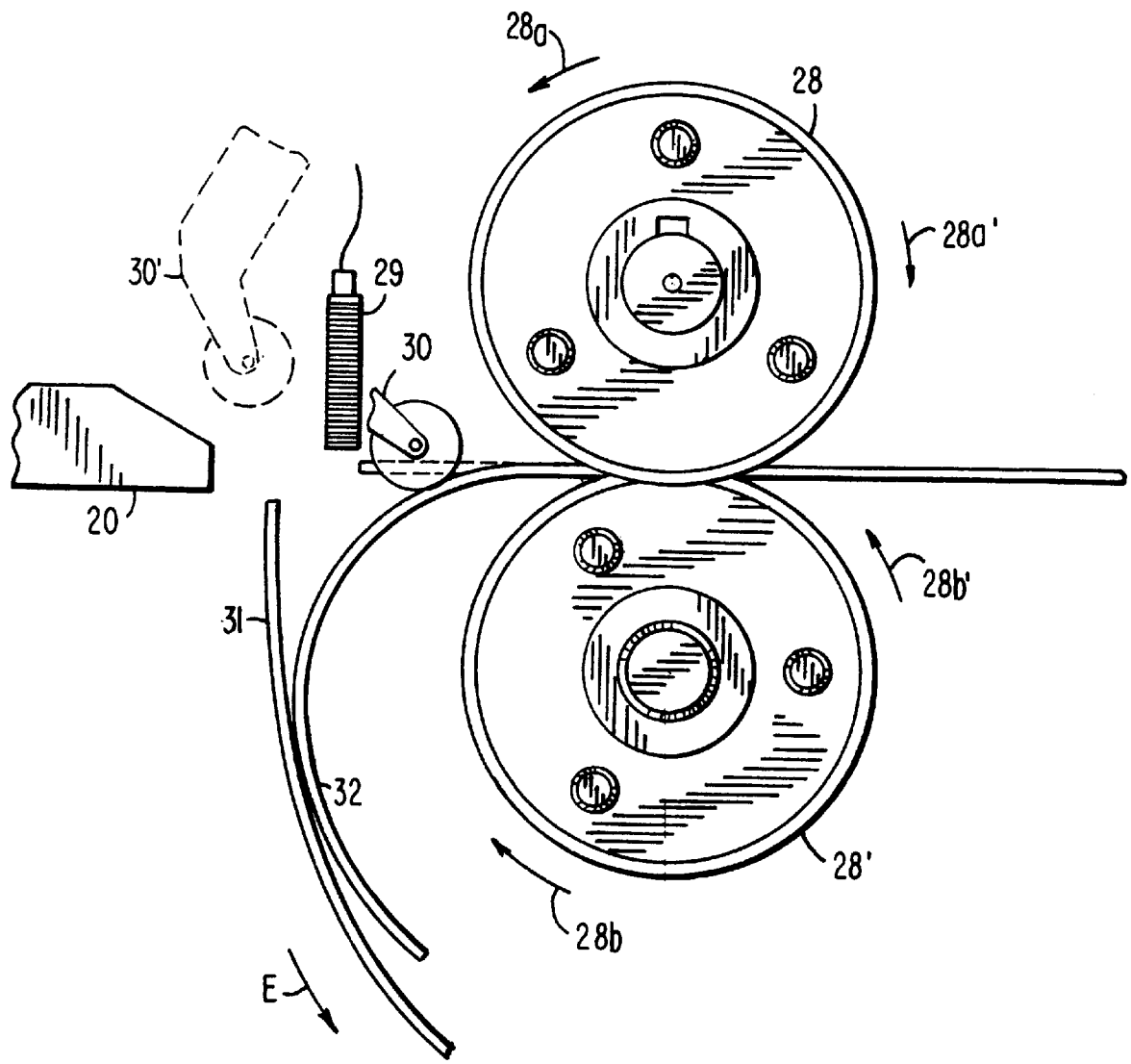
FIG. 5 is a view taken along line 5—5 of FIG. 4, showing additional components which can be incorporated into the system of FIG. 4 to eject unutilized insulation material remaining in the insulating machine.

FIG. 5 is a view taken along line 5—5 of FIG. 4, showing additional components which may be incorporated into the system of FIG. 4 to eject unutilized insulation material remaining in the insulating machine whenever the reel needs to be changed with another reel. In FIG. 5, the system further includes a sensor 29, a deflector 30 and a contoured plate 31. Unutilized insulation material remaining in the insulating machine is desired to be ejected when the reel being provided to the insulating machine has run out and the unutilized insulation material remaining in the insulating machine is not sufficient for use by the insulating machine.

When the sensor 29 determines that the insulation material being provided to the insulating machine has run out (for example, by not sensing further passage or presence of insulation material), the sensor 29 generates a signal which causes the rollers 28, 28' to stop moving in directions 28a, 28b. This stoppage is controlled to occur when end portion 32 of the insulation material is still clamped between the rollers. While the rollers 28, 28' are stopped, the insulating machine finishes insulating a stator or an armature already present by using the insulation material which is available therein.

Once insulation of the stator or armature has been completed, the rollers 28, 28' are caused to be reverse rotated, as shown by directions 28a', 28b', respectively, to remove the insulation material still remaining in the insulating machine. Prior to the reverse rotation of the rollers in directions 28a', 28b', the deflector 30 is actuated into the position shown in FIG. 5 from its ordinary position shown by the dashed line 30'. The position shown by the dashed line 30' is the position which the deflector 30 occupies during the normal feed of the insulation material to the insulating machine. The actuation of the deflector 30 is preferably by a conventional mechanical actuator (not shown).

The deflector 30 serves to guide the remaining insulation material towards the contoured plate 31. The contoured plate 31 extends in direction E to reach a collection bin (not shown). The deflector 30 and the contoured plate 31 therefore cause the remaining unutilized insulation material to run along the surface of the contoured plate and to fall into the collection bin. The rollers 28, 28' will keep rotating in directions 28a', 28b', respectively, to send the entire length of the remaining insulation material to the collection bin. For the system shown in FIG. 5, this means that the rollers will keep rotating in directions 28a', 28b' until no more passage and presence of the insulation material is sensed by the sensor 29.

Following the removal of the unutilized insulation material remaining in the insulating machine, the deflector 30 is actuated to move to the position indicated by the dashed line 30' to allow the lead portion RL of a new reel to become aligned with the insulating machine as described hereinbefore.

It should be noted that with the reel changing device 15 of the present invention, while the insulating machine is being provided with a reel of insulation material from one of the reel holders, the other reel holders can be provided with new reels as needed so that when the reel being fed to the insulating machine needs to be changed, a new reel can be provided to the insulating machine with minimal downtime and disruption.

FIGS. 6–8 show another embodiment of a reel changing device of the present invention. FIG. 6 shows a support arm 100' together with its corresponding reel holder 10. The support arm 100' of FIG. 6 differs from the support arm 10' of FIG. 1 in that the support arm 100' has a mountable section 51.

In FIG. 7, there is shown a movable table 53 having a plurality openings 52. As is illustrated in FIG. 8, the mountable section 51 of the support arm 100' is configured to correspond to an opening 52 of the table 53. This configuration of the mountable section 51 and the opening 52 permits the removable mounting of the support arm 100' on the table 53. Adjacent the opening 52, there is provided a securing member, shown illustratively as manually actuatable screws 55, for securing the support arm 100' to the table 53.

The table 53, as shown in FIG. 7, is a linearly movable table. Linear movement is achieved in a conventional manner, such as by being slidably mounted on a rod 60. The actuation of the linearly movable table 53 is preferably by a conventional mechanical actuator (not shown).

The operation of the reel changing device of FIGS. 6–8 is as follows: The openings 52 of the table 53 are provided with the mountable support arms 100'. As described with respect to the previous embodiment of the reel changing device 15 of the invention, a reel of insulation material is provided from one of the support arms to the insulating machine (not shown). When a reel needs to be changed, the table 53 is moved in a linear direction, shown illustratively in FIG. 7 by arrow H, so that another support arm having a new reel of insulation material is provided to the insulating machine.

Note that in the embodiment of the invention illustrated in FIGS. 6–8, the support arms 100' can be provided with new reels away from the table 53. For example, the support arms can be provided with new reels at a bench by an operator for greater comfort in performing this task. Also, the operation of threading the insulation material through the opening in the guide 19 and the brake pad assembly 20 can take place at the bench. Thus, the operator is required to spend less time at the reel changing device without disrupting the operation of the insulating machine. Furthermore, as with the previous embodiment of the reel changing device, there is minimal downtime and disruption when a reel needs to be changed.

It will be understood that the foregoing is only illustrative of the principles of the invention, and that various modifications can be made by those skilled in the art without departing from the scope and spirit of the invention.

The invention claimed is:

1. Apparatus for providing insulating material in elongated strip form to a nip between a pair of feed rollers that are respectively rotatable about a pair of parallel feed roller rotation axes comprising:

reel holding structure configured to hold a plurality of reels of the strip-form insulating material with a leading end portion of the strip from each reel extending in a cantilevered condition from the reel holding structure;

second structure configured to selectively move the reel holding structure relative to the feed rollers so that the cantilevered end portion of any the strip from reel can be made to move sideways relative to the feed rollers and thereby be made to approach the nip between the feed rollers along an axis which is substantially parallel to the feed roller rotation axes; and a guide surface which is stationary relative to the nip between the feed rollers and which is configured to guide into the nip the cantilevered end portion of the strip from any reel that is approaching the nip as a result of operation of the second structure.

2. The apparatus of claim 1 further comprising a movable deflector and a contoured plate positioned such that when the strip-form insulating material is being withdrawn in a reverse direction by the feed rollers toward the reel holding structure, the movable deflector directs the strip-form insulating material away from the reel holding structure and onto the contoured plate.

3. The apparatus of claim 1 further comprising a sensor that determines when the reel from which the strip-form insulating material is being drawn has run out, generates a signal in response to such determination that causes the strip-form insulating material remaining between the feed rollers to be ejected, and senses when the ejection of the remaining strip-form insulating material has been completed.

4. The apparatus of claim 1 further comprising a pair of actuatable catch members for preventing the movement of the reel holding structure in order to maintain the alignment of the feed rollers and the reel from which the strip-form insulating material is being drawn.

5. The apparatus of claim 1 wherein the reel holding structure comprises a linearly translating table having a plurality of openings and a plurality of removable reel holders, wherein each removable reel holder has at least one reel rotatably mounted thereon and has a mountable section configured to fit in one of the openings in the linearly translating table.

6. Apparatus for providing insulating material in elongated strip form to a nip between a pair of feed rollers configured to draw the strip-form insulating material in a forward direction and to withdraw the strip-form insulating material in a reverse direction comprising:

reel holding structure configured to hold a plurality of reels of the strip-form insulating material and being movable relative to the pair of feed rollers such that the strip-form insulating material from any reel can be made available to be drawn in the forward direction by the pair of feed rollers;

a contoured plate; and a movable deflector for directing the strip-form insulating material away from the reel holding structure and onto the contoured plate when the strip-form insulating material is being withdrawn in the reverse direction by the feed rollers.

7. The apparatus of claim 6 further comprising a guide surface which is stationary relative to the nip between the feed rollers and which is configured to guide into the nip the strip-form insulating material from the reel that is being lined up with the feed rollers as a result of movement of the reel holding structure.

8. The apparatus of claim 6 further comprising a sensor that determines when the reel from which the strip-form insulating material is being drawn has run out, generates a signal in response to such determination that causes the strip-form insulating material remaining between the feed rollers to be ejected, and senses when the ejection of the remaining strip-form insulating material has been completed.

9. The apparatus of claim 6 further comprising a pair of actuatable catch members for preventing the movement of the reel holding structure in order to maintain the alignment of the feed rollers and the reel from which the strip-form insulating material is being drawn.

10. The apparatus of claim 6 wherein the reel holding structure comprises a linearly translating table having a plurality of openings and a plurality of removable reel holders, wherein each removable reel holder has at least one reel rotatably mounted thereon and has a mountable section configured to fit in one of the openings in the linearly translating table.

* * * * *